United States Patent
Crickmore et al.

(10) Patent No.: US 9,816,853 B2
(45) Date of Patent: Nov. 14, 2017

(54) FIBRE OPTIC CABLE FOR ACOUSTIC/SEISMIC SENSING

(71) Applicant: OPTASENSE HOLDINGS LIMITED, Farnborough, Hampshire (GB)

(72) Inventors: Roger Crickmore, Farnborough (GB); David Hill, Hampshire (GB)

(73) Assignee: Optasense Holdings Limited (GB)

( * ) Notice: Subject to any disclaimer, the term of this patent is extended or adjusted under 35 U.S.C. 154(b) by 178 days.

(21) Appl. No.: 14/435,868

(22) PCT Filed: Oct. 25, 2013

(86) PCT No.: PCT/GB2013/052795
§ 371 (c)(1),
(2) Date: Apr. 15, 2015

(87) PCT Pub. No.: WO2014/064460
PCT Pub. Date: May 1, 2014

(65) Prior Publication Data
US 2015/0355015 A1    Dec. 10, 2015

(30) Foreign Application Priority Data
Oct. 26, 2012    (GB) .................................. 1219331.1

(51) Int. Cl.
| G01H 9/00 | (2006.01) |
| G01V 1/22 | (2006.01) |
| G01L 1/24 | (2006.01) |
| G01V 1/20 | (2006.01) |
| G01D 5/353 | (2006.01) |

(52) U.S. Cl.
CPC ............ *G01H 9/004* (2013.01); *G01L 1/242* (2013.01); *G01V 1/208* (2013.01); *G01V 1/226* (2013.01); *G01D 5/35358* (2013.01)

(58) Field of Classification Search
CPC ........ G01H 9/004; G01V 1/208; G01V 1/226; G01V 1/181; G01V 1/189; G01L 1/242; G01P 15/093
See application file for complete search history.

(56) References Cited

U.S. PATENT DOCUMENTS

| 4,468,091 A | 8/1984 | Schmadel et al. |
| 4,524,436 A | 6/1985 | Hall et al. |

(Continued)

FOREIGN PATENT DOCUMENTS

| GB | 2197953 | 6/1988 |
| GB | 2386687 | * 9/2003 |

(Continued)

*Primary Examiner* — Helen Kwok
(74) *Attorney, Agent, or Firm* — McDonnell Boehnen Hulbert & Berghoff LLP

(57) ABSTRACT

Fiber optic cable structures suitable for distributed acoustic sensing that are capable of discriminating between stimuli acting on the cable in different directions, the cable structure including a core structure (202, 203, 204) with an optical fiber wound around the periphery of the core structure, the core further including a mass (203) which is movable in a preferred direction within the cable such that movement of said mass in said preferred direction causes a change in length of the fiber wound around the periphery of the core.

21 Claims, 2 Drawing Sheets

(56) References Cited

U.S. PATENT DOCUMENTS

| | | | |
|---|---|---|---|
| 4,951,271 A * | 8/1990 | Garrett | G10K 9/121 |
| | | | 356/477 |
| 4,984,863 A | 1/1991 | Parriaux et al. | |
| 5,317,929 A * | 6/1994 | Brown | G01P 15/093 |
| | | | 73/514.01 |
| 5,431,058 A * | 7/1995 | Lagier | G10K 9/121 |
| | | | 310/337 |
| 6,175,108 B1 * | 1/2001 | Jones | G01P 15/093 |
| | | | 250/227.14 |
| 6,188,645 B1 * | 2/2001 | Maida, Jr. | G01V 1/22 |
| | | | 367/149 |
| 2001/0022757 A1 * | 9/2001 | Skinner | G10K 9/121 |
| | | | 367/161 |
| 2005/0115320 A1 * | 6/2005 | Thomas | G01P 15/093 |
| | | | 73/514.01 |
| 2006/0109746 A1 * | 5/2006 | Crickmore | G01H 9/004 |
| | | | 367/178 |
| 2006/0120675 A1 | 6/2006 | Goldner et al. | |
| 2008/0085074 A1 | 4/2008 | Wakahara et al. | |
| 2008/0221488 A1 | 9/2008 | Kurono et al. | |
| 2008/0229825 A1 * | 9/2008 | Crickmore | G01H 9/004 |
| | | | 73/514.26 |
| 2011/0069302 A1 * | 3/2011 | Hill | G01V 1/186 |
| | | | 356/73.1 |

FOREIGN PATENT DOCUMENTS

| | | |
|---|---|---|
| GB | 2442745 | 4/2008 |
| WO | WO2011/058314 | 5/2011 |
| WO | WO 2012/177547 | 12/2012 |
| WO | WO 2013/090544 | 6/2013 |

\* cited by examiner

FIBRE OPTIC CABLE FOR ACOUSTIC/SEISMIC SENSING

FIELD OF THE INVENTION

The present invention relates to optical fibres and fibre optic cables suitable for use in distributed fibre optic sensing, especially for use in distributed acoustic fibre optic sensing and to enhancements in the design, application and manufacture of optical fibre and/or fibre optic cable for distributed fibre optic sensors.

BACKGROUND OF THE INVENTION

Various sensors utilizing optical fibres are known. Many such sensors rely on fibre optic point sensors or discrete reflection sites such as fibre Bragg gratings or the like being arranged along the length of an optical fibre. The returns from the discrete point sensors or reflection sites can be analysed to provide an indication of the temperature, strain and/or vibration in the vicinity of the discrete sensors or reflection sites.

Fully distributed fibre optic sensors are also known in which the intrinsic scattering from a continuous length of optical fibre is used. Such sensors allow use of standard fibre optic cable without deliberately introduced reflection sites such fibre Bragg gratings or the like. The entire optical fibre from which a backscatter signal can be detected can be used as part of the sensor. Time division techniques are typically used to divide the signal returns into a number of time bins, with the returns in each time bin corresponding to a different portion of the optical fibre. Such fibre optic sensors are referred to as distributed fibre optic sensors as the sensor portions are fully distributed throughout the entire optical fibre. As used in this specification the term distributed fibre optic sensor will be taken to mean a sensor in which the optical fibre itself constitutes the sensor and which does not rely on the presence of specific point sensors or deliberately introduced reflection or interference sites, that is an intrinsic fibre optic sensor.

GB patent application publication No. 2,442,745 describes a distributed acoustic fibre optic sensor system wherein acoustic vibrations are sensed by launching a plurality of groups of pulse modulated electromagnetic waves into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group.

Distributed fibre optic sensing therefore provides useful and convenient sensing solutions that can monitor long lengths of optical fibre. Standard telecommunications optical fibre, e.g. single mode 125 µm optical fibre, can be used which means that the sensing fibre is relatively cheap and readily available and, in some instances, it may be possible to use existing optical fibres for acoustic monitoring.

The ability to use conventional fibre optic cable for distributed acoustic sensing is advantageous in a number of different applications. However for some applications the sensitivity of a DAS system on conventional fibre may not be sufficient, for instance for various seismic applications. Also in some applications it would be beneficial to be able to discriminate between stimuli incident from different directions.

WO2012/177547 describes a fibre optic cable in which directional sensitivity is enhanced. An inertial mass is attached to a fibre, and is able to move (possibly in a constrained manner) in a housing. However, incorporation of such an inertial mass into a sensor apparatus is complex to implement and places a strain on the fibre.

SUMMARY OF THE INVENTION

According to a first aspect of the present invention there is provided a fibre optic cable comprising: a core structure; and an optical fibre wound around the periphery of the core structure, wherein the core comprises a mass which is moveable in a preferred direction within the cable such that movement of said mass in said preferred direction causes a change in length of the fibre wound around the periphery of the core.

The cable may comprise a first shell with the core deployed within the first shell so that said mass is moveable with respect to the shell. The core may comprise a mass located on one side of the core with the opposite side of the core being mechanically coupled to the shell. The core may comprise a compliant material between the mass and the part of the core coupled to the shell. The part of the core coupled to the shell may comprise a first former and the mass may comprise a second former. In some embodiments the second former is heavier than the first former.

In general the core comprises a first guide portion and a second guide portion wherein the separation between the guide portions is variable due to movement of said mass.

In some embodiments the guide portions are separated by a deformable structure. The mass may be coupled to or form part of the deformable structure. The deformable structure and guide portions may be arranged such that if compressed in one transverse direction the length around the periphery of the core does not change whereas in compressed in the orthogonal transverse direction the length around the periphery of the core does change.

The deformable structure may comprise a generally elliptical cross section with the first and second guide portions are coupled to opposite ends of a first axis of the ellipse, where the first axis is either the major or minor axis of the ellipse.

The guide portions preferably have a length in a direction orthogonal to the first axis which is substantially the same as the length of the deformable structure. The mass may be coupled to the deformable structure at one end of a second axis of the ellipse. The first axis may be orthogonal to the second axis, i.e. the mass is coupled to one side of the elliptic structure and the end portions are coupled to the adjacent sides, or the first axis may the same as the second axis, i.e. the mass is located at one end of the ellipse with one of the guide portions.

In any of the embodiments the mass may comprise a part of the cable structure having one or more wires of heavy material running there through.

The optical fibre may be wound around the core in a helical pattern.

In some embodiments the fibre optic cable further comprises at least one fibre not coiled around the core.

According to another aspect, there is provided a fibre optic cable having a substantially planar form, the cable comprising an elongate strip and an optical fibre, wherein the optical fibre is attached to the strip so as to follow a meandering path along the length of the strip such that fibre length is greater than the strip length.

By virtue of its dimensions the strip will generally be harder to flex across its (relatively short) width than along its (relatively long) length and will therefore be sensitive to signals perpendicular to the plane of the cable. If the cable is laid flat, such that the plane of the cable is roughly parallel to the earth's surface in that vicinity, this could provide sensitivity to vertical waves such as s-waves.

The strip may comprise a base material layer, advantageously providing a firm surface on which the fibre can be laid, which may simplify the construction of the cable. The fibre may be over moulded to provide a smooth, flat profile and to protect the fibre.

Such a cable may comprise a further layer of material (for example as an encapsulating material), wherein the elongate strip has a first Young's modulus and the layer of material has a second Young's modulus, and the first Young's modulus is higher than the second Young's modulus. Having two layers of different Young's moduli means that the fibre is not on the neutral axis of the structure and so will experience a larger strain when the structure is bent in its dominant direction.

The invention also relates to a distributed acoustic sensing system comprising an interrogator unit for interrogating an optical fibre with interrogating radiation to provide a distributed acoustic sensor and any of the fibre optic cables as described above arranged to be interrogated by the interrogator unit. The fibre optic cable may be deployed so that the preferred direction is vertical.

The invention also relates to the use of such a fibre optic cable in a distributed acoustic sensor, and in particular to the use of such a fibre optic cable for detecting seismic s-waves in a distributed acoustic sensor.

DESCRIPTION OF THE DRAWINGS

The invention will now be described by way of example only with reference to the following drawings, of which.

DESCRIPTION OF THE INVENTION

Figure 1:
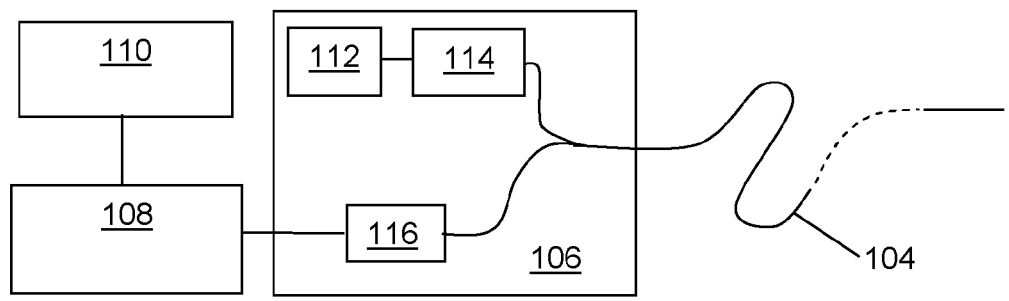
FIG. 1 illustrates a conventional DAS sensor apparatus.

FIG. 1 shows a schematic of a conventional fibre optic distributed acoustic sensing (DAS) arrangement. A length of sensing fibre 104 is removably connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length and can be, for instance 40 km or more in length. In many typical DAS applications the sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the fibre may comprise a fibre which has been fabricated to be especially sensitive to incident vibrations. In use the fibre 104 is deployed in an area of interest to be monitored.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto, although DAS sensors relying on a single interrogating pulse are also known and may be used. Note that as used herein the term "optical" is not restricted to the visible spectrum and optical radiation includes infrared radiation and ultraviolet radiation. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulses separated by a known optical frequency difference. The interrogator also comprises at least one photodetector 116 arranged to detect radiation which is Rayleigh backscattered from the intrinsic scattering sites within the fibre 104. A Rayleigh backscatter DAS sensor is very useful in embodiments of the present invention but systems based on Brillouin or Raman scattering are also known and could be used in embodiments of the invention.

The signal from the photodetector is processed by signal processor 108. The signal processor conveniently demodulates the returned signal based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective optical path length within a given section of fibre, such as would be due to incident pressure waves causing strain on the fibre, can therefore be detected.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre of the order of 40 km say provides 4000 independent acoustic channels or so deployed along the 40 km of fibre.

It has been proposed to use DAS in a range of applications including in seismic monitoring and/or surveying. Typically seismic surveying and monitoring type applications rely on point sensors such as geophones which may be relatively complex and costly apparatus. Typical geophones are point sensors that detect a stimulus at a point and thus monitoring over an area requires deploying an array of geophones in a desired pattern which can be difficult and time consuming. The ability to use a long fibre optic cable which can be easily deployed in an area of interest to provide sensing is an advantage of DAS.

Conventional DAS sensors do have some potential drawbacks however for some applications such as seismic monitoring. First the sensitivity of a conventional DAS arrangement may be relatively low compared to a seismic point sensor such as a geophone. Second DAS sensing is largely directionally insensitive.

In surface seismic monitoring it is often desired to monitor both the seismic p-waves and also the S-waves. In conventional surface seismic measurements 3-axis geophones or accelerometers are typically deployed to measure the S-waves, though often only the vertical motion is used in processing. For conventional DAS it is difficult to separate the vertical component of any stimulus.

It would be possible improve the sensitivity of a DAS system by arranging the sensing fibre optic in a spiral wound around a compliant mandrel core. This could increase the effect of any stimulus on the fibre and hence improve sensitivity. However due to the circular symmetry such a design would still mean it would be difficult to separate the (vertical) s-wave component in the signal from other stimuli.

Embodiments of the present invention therefore provide improved designs of fibre optic cable that can be used for a range of applications but in particular for seismic monitoring.

Figure 2:
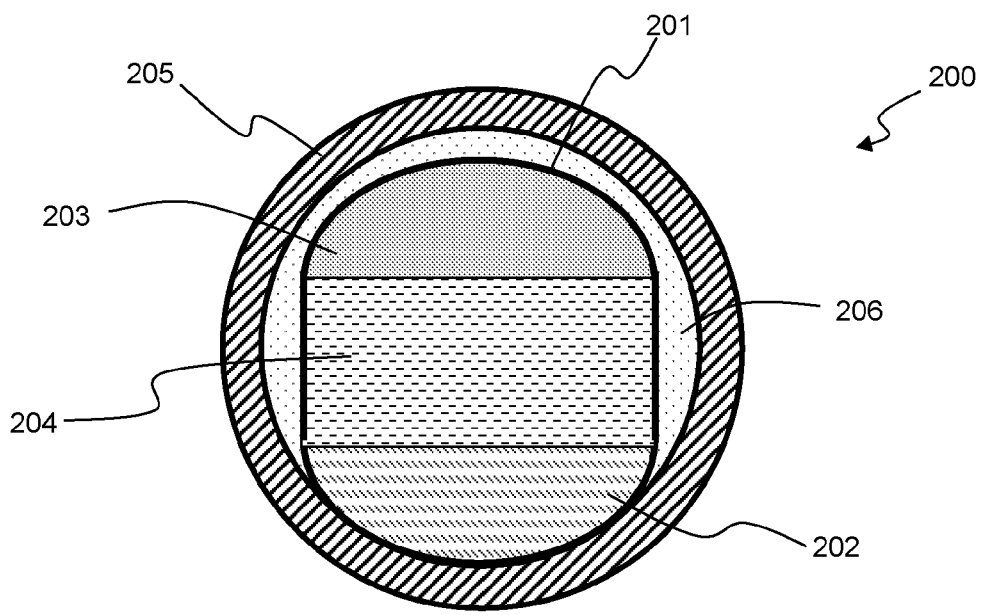
FIG. 2 illustrates fibre optic cable according to an embodiment of the invention.

FIG. 2 illustrates a cross-section of a fibre optic cable 200 according to an embodiment of the invention. At least one optical fibre 201 is arranged wound around the periphery of a core structure. The core structure consists of a first former 202, which in this arrangement is semi-circular separated from a second semi-circular former 203 by a compliant material 204. The first former 202 is bonded, or otherwise firmly attached, to a shell 205, which may for instance by the outer shell of the cable or an intermediate jacket shell. The second former 203 is heavier than the first former 202 and is arranged so as to be moveable within the shell 205 of the cable in a preferred direction, which is the direction between the two formers. The second former 203 acts as a mass which is movable within the cable and the core is arranged within the cable such that movement of the mass, i.e. second former 203 in the preferred direction causes a change in length of the fibre wound around the periphery of the core.

In other words the second former 203 is moveable with respect to shell in the direction between the two formers, i.e. the vertical direction as shown in FIG. 2. The mass of the second former 203 is thus located on one side of the core and the other side, which comprises the first former is mechanically coupled to the shell. If such a cable is vibrated in the vertical direction as shown the heavy former 202 will acts like a seismic mass.

For maximum sensitivity the material and dimensions of the compliant material, which may be formed as compliant strip, are chosen so that during acceleration most of the force transmitted to the heavy former is via the fibre rather than by the compliant strip. Also within the shell 205 is a material 206, typically a soft material which helps keep the core structure in position but does not significantly affect its mechanical response.

As mentioned then the force to accelerate the mass, i.e. former 203, will be transferred via the wound fibre 201 which will therefore be subject to a change in path length as the inertia of the former 202 causes stretching of the fibre. This can provide a relatively large DAS signal as the path length within the optical fibre changes. The presence of heavy former 203 thus improves the sensitivity of such a fibre optic cable when used for DAS as compared to conventional fibre optic cable. The formers 202 and 203 act as end guide portions for the fibre and mean that there is no substantial change in length for vibrations in a direction which orthogonal to the preferred direction, e.g. the horizontal direction as shown in FIG. 2.

Such a cable will, if orientated as shown in FIG. 2, thus give the greatest signal when vibrated in a vertical direction although it will also produce some signal if the vibrated in either of the two horizontal directions. If such a cable is therefore deployed in this orientation for surface seismic monitoring the dominant response will be to any disturbances in the vertical plane.

The cable as shown is generally circular so some marking or alignment structure could be included to ensure that it can be laid in the correct orientation. In other embodiments however the shape of shell 205 could be varied, for instance to have a flat edge under former 202 or above former 203 to provide ease of alignment in a desired orientation. In some embodiments the shell 205 may be the outer shell of the cable but in other embodiments the shell 205 may be at least partly encased in other jacket or protective layers.

The optical fibre 201 may be any type of standard optical fibre. The optical fibre may be provided with a jacket material around the core and cladding to provide some protection for the fibre.

Figure 3:
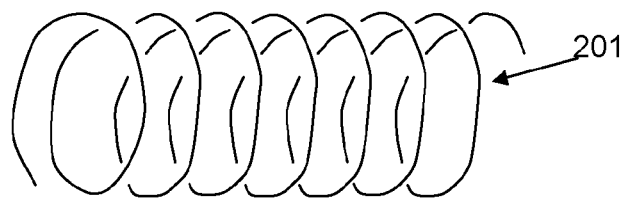
FIG. 3 illustrates how the optical fibre may be arranged in a fibre optic cable such as shown in FIG. 2.

As mentioned the fibre is wound round the core region comprising the two formers 202 and 203 and the compliant material. The optical fibre may be wound in a spiral or helical type pattern around the core. FIG. 3 illustrates the type of winding arrangement of the optical fibre within the cable, i.e. omitting the core, and surrounding soft material and shell for clarity.

The pitch of the helix may be chosen to provide a desired spatial resolution. In use the fibre is interrogated with radiation pulses of particular duration and the duration of the pulse(s) may define the length, in the fibre, of each sensing portion. The minimum length of the sensing portion may in part be determined by the overall length of fibre being interrogated, as the interrogating pulses which define the size of the sensing portion may need to be of a minimum duration to ensure acceptable returns from the end of the fibre. The spatial resolution of the sensor itself however depends on how the fibre is arranged. Using a helical winding, a given length of cable may correspond to a greater length of optical fibre, thus improving the spatial resolution of the ultimate sensor—or alternatively providing a greater sensitivity for a given sensing length.

The winding may also be arranged to ensure that most of the force transferred to the fibre is in the direction between the two formers. In other words the windings should be such that there is no significant force causing the formers to slide with respect to one another or the fibre to slide over the formers. One or both formers could be provided with protrusions on their outer surfaces to avoid significant slippage of the fibre over the surface of the formers and/or the fibre could be provided in trenches or depressions within the outer surface of the former.

As mentioned the former 203 is heavier than former 202. Former 203 may be formed out of a heavier material or may be provided with heavy materials within the body of the former. In particular the former 203 may comprise one or more wires of a relatively heavy material.

Whilst semicircular formers are described the formers could be of any shape and do not necessarily have to be of the same size. In some instance it may not be necessary to have a second former if relevant sections of the fibre can be secured to the lower part of the shell 205 say such that the fibre is anchored to the shell and thus it is the fibre which transfers force to former 203. However the use of a second former to form a core around which the fibre can be wound may simplify manufacture and, as mentioned the formers act as guide sections for guiding the fibre winding around the core structure in such a way to help ensure that changes in length of the fibre are most pronounced in response to stimuli in the preferred direction.

In general the formers 202 and 203 act as guide portions which are arranged such that separation between the guide portions is variable due to movement of the former 203 which acts as a seismic mass.

Figure 4:
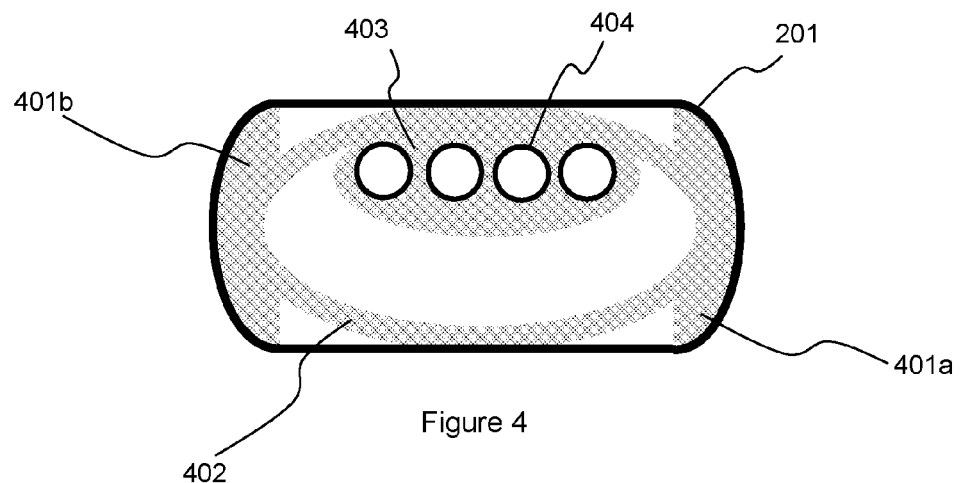
FIG. 4 illustrates another fibre optic cable according to an embodiment of the invention.

FIG. 4 illustrates another embodiment of the invention. FIG. 4 shows just the core section of the fibre optic cable which may in use be surrounded in a suitable jacket or shell material. In this embodiment the optical fibre 201 is again wound around the core structure. Here the core comprises a first end region 401a and a second end region 401b which act as formers or guide portions. The end portions are separated by a deformable portion 402 which, in this example has the general shape of an ellipse. A mass 403 is coupled to or forms part of the deformable structure.

The embodiment shown in FIG. 4 works on the principle that if an elliptical shell is compressed along either its major or minor axis the other axis extends but the circumference of the ellipse remains unchanged. In the arrangement shown in FIG. 4 if the deformable structure is compressed along its minor axis the major axis will extend. Although the minor axis will reduce the shape of the end guide portions 401a and 401b is such that changes in length along this axis do not substantially affect the length of the fibre. Thus if the major axis extends this will cause a stretching, i.e. a change in length, of the optical fibre which will lead to a detectable signal.

The mass 403, being coupled to the deformable structure along one side of the minor axis will preferentially move along the minor axis. If the cable is vibrated upwards the inertia provided by the mass will result in compression of the deformable structure along the minor axis—and thus an extension along the major axis and a detectable change in path length of the fibre around the periphery.

It will be noted that the mass 403 may be less free to move along the major axis but even if it does a compression along the major axis will result in an extension along the minor axis. Thus the overall length around the periphery of the core will not significantly change and the cable will be relatively insensitive to vibrations along the major axis.

In general then the deformable structure 402 and end guide portions 401a, 401b are arranged such that if compressed in one transverse direction (in this case along the major axis) the length around the periphery of the core does not change whereas in compressed in the orthogonal transverse direction (i.e. along the minor axis) the length around the periphery of the core does change. As mentioned the deformable structure may have a generally elliptic cross section but other shapes may be used to provide the same general effect.

Whilst the end portions 401a and 401b are shown as coupled to the opposite ends of the major axis in an alternative arrangement they could instead be coupled to opposite ends of the minor axis—in which case they may have a length as long as the major axis so that a compression along the major axis causes an extension of length along the minor axis which results in a change of length of the fibre wound around the core structure. Further possible arrangements include having force and fibre both aligned with the same axis, be it the major or minor one To ease manufacture the core structure could be formed from an extruded polymer material. To form the mass 403 one or more portions of a relatively heavy material could be co-extruded for instance to form wire like structures 404 within the mass. This allows the entire core structure to be formed from a continuous extrusion process with the optical fibre being wound around the core after fabrication.

Again the optical fibre may be wound in a desired helical pattern along the core to provide a desired spatial resolution. In some embodiments there may be more than one optical fibre wound around the core, the fibre being displaced with respect to one another along the length of the core.

In some embodiments the fibre optic cable structure may comprise at least one optical fibre which is not wound around the core structure. Such an optical fibre may not exhibit a particular directional sensitivity and may respond relatively equally to stimuli acting on the cable in any direction. In such a case comparing DAS signals from both fibres may provide additional information in order to identify stimuli acting in the preferred direction.

The optical fibre which is not wound around the core may simply run along the length of the cable. In this case it may exhibit a different spatial resolution in use than the fibre wound round the core if interrogated with similar interrogating radiation. In some embodiments the additional fibre may be coiled to provide the same spatial resolution as the fibre coiled around the core.

The fibre optic cables according to the present invention thus provide sensing cables for DAS with improved sensitivity compared to conventional fibre optic cables and which have a directional sensitivity. Long cables lengths can be achieved and the cables can be relatively easily manufactured and handled.

Figure 5A:
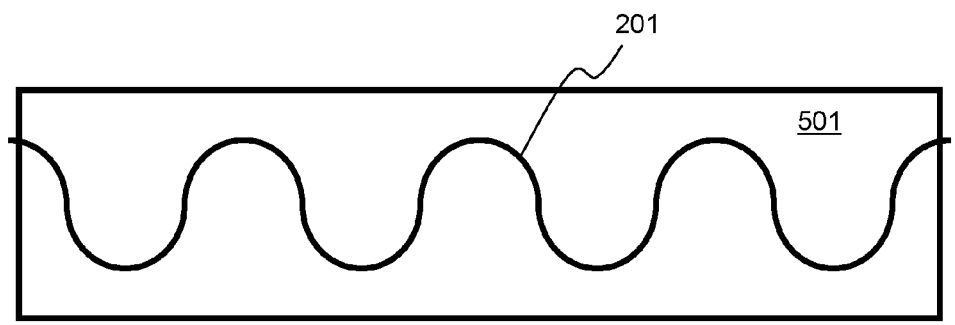
FIGS. 5a and 5b shows plan and section views of an alternative arrangement for ensuring directional sensitivity.
Figure 5B:
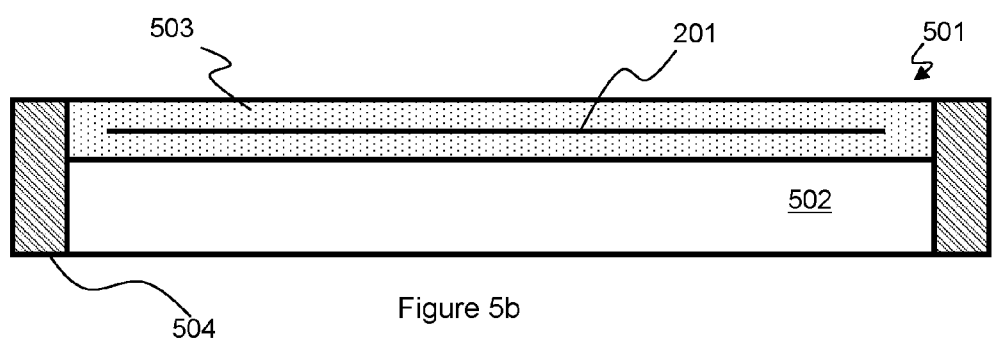

FIG. 5 illustrates an alternative arrangement for achieving directional sensitivity. FIG. 5a shows a plan view of a cable structure and FIG. 5b shows a sectional view.

FIG. 5 illustrates an optical fibre 201 which is attached to an elongate strip 501. The optical fibre 201 is deployed on the strip 501 in a wave configuration, i.e. in a meandering path. The fibre may be easily attached to the strip during fabrication using a tool with a gearing to a reciprocating screw drive mounted fibre deployment guide. The fibre can then be over moulded to form a sandwich structure resulting in a flat long cable structure.

High sensitivity can be achieved by deploying the fibre in a wave/meandering pattern that provide a high fibre length to cable length ratio. Bend tolerant fibre may be used to ensure low loss and high strength at bends and a small diameter fibre (e.g. 80 μm or 50 μm diameter) for higher strain response.

Due to the dimensions, the cable should be stiff in horizontal cross axis. Although it will have inline sensitivity, it is the vertical s-wave sensitivity that should dominate.

Whilst a single strip structure may be used the sensitivity may be improved by creating it as a two layer structure as shown in FIG. 5b. A base material 502 may have a relatively high Young's modulus. This base material layer will provide a firm surface on which the fibre can be laid, which should simplify the construction of the cable. The fibre may then be encapsulated in a material 503 of lower Young's modulus. Having the two layers of different Young's moduli means that the fibre is not on the neutral axis of the structure and so will experience a larger strain when the structure is bent in its dominant direction. Longitudinal strengthening members 504 may also be provided along the edges of the structure.

The invention claimed is:

1. A fibre optic cable comprising:
   a core structure; and an optical fibre wound around a periphery of the core structure, wherein the core structure comprises a mass which is moveable in a preferred direction within the cable such that movement of said mass in said preferred direction causes a change in length of the fibre wound around the periphery of the core structure.

2. A fibre optic cable as claimed in claim 1 wherein the cable comprises a first shell and the core is deployed within the first shell so that said mass is moveable with respect to the shell.

3. A fibre optic cable as claimed in claim 2 wherein the core comprises a mass located on one side of the core and the opposite side of the core structure is mechanically coupled to the shell.

4. A fibre optic cable as claimed in claim 3 wherein the core structure comprises a compliant material between the mass and the part of the core structure coupled to the shell.

5. A fibre optic cable as claimed in claim 3 wherein a part of the core structure coupled to the shell comprises a first former.

6. A fibre optic cable as claimed in claim 5 wherein the mass comprises a second former.

7. A fibre optic cable as claimed in claim 6 wherein the second former is heavier than the first former.

8. A fibre optic cable as claimed in claim 1 wherein the core structure comprises a first guide portion and a second guide portion wherein a separation between the guide portions is variable due to movement of said mass.

9. A fibre optic cable as claimed in claim 8 wherein said guide portions are separated by a deformable structure.

10. A fibre optic cable as claimed in claim 9 wherein said mass is coupled to or forms part of said deformable structure.

11. A fibre optic cable as claimed in claim 9 wherein the deformable structure and guide portions are arranged such that if compressed in one transverse direction the length around the periphery of the core structure does not change whereas in compressed in an orthogonal transverse direction the length around the periphery of the core structure does change.

12. A fibre optic cable as claimed in claim 9 wherein the deformable structure comprises a generally elliptical cross section and the first and second guide portions are coupled to opposite ends of a first axis of the generally elliptical cross section, where the first axis is either the major or minor axis of the generally elliptical cross section ellipse.

13. A fibre optic cable as claimed in claim 12 wherein the guide portions have a length in a direction orthogonal to the first axis which is substantially the same as the deformable structure.

14. A fibre optic cable as claimed in claim 12 wherein the mass is coupled to the deformable structure at one end of a second axis of the generally elliptical cross section.

15. A fibre optic cable as claimed in claim 14 wherein the first axis is one of orthogonal to the second axis or the same as the second axis.

16. A fibre optic cable as claimed in claim 1 wherein the mass comprises a part of the core structure having one or more wires of heavy material running therethrough.

17. A fibre optic cable as claimed in claim 1 wherein the optical fibre is wound around the core structure in a helical pattern.

18. A fibre optic cable as claimed in claim 1 further comprising at least one fibre not coiled around the core structure.

19. A distributed acoustic sensing system comprising an interrogator unit for interrogating an optical fibre with interrogating radiation to provide a distributed acoustic sensor and the fibre optic cable as claimed in claim 1 arranged to be interrogated by said interrogator unit.

20. A distributed acoustic sensing system as claimed in claim 19 wherein the fibre optic cable is deployed so that the preferred direction is vertical.

21. The use of the fibre optic cable as claimed in claim 1 in a distributed acoustic sensor.

* * * * *